(12) United States Patent
Graefe et al.

(10) Patent No.: US 9,836,504 B2
(45) Date of Patent: Dec. 5, 2017

(54) QUERY PROGRESS ESTIMATION BASED ON PROCESSED VALUE PACKETS

(75) Inventors: Goetz Graefe, Madison, WI (US);
Harumi Kuno, Cupertino, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1805 days.

(21) Appl. No.: 12/495,628

(22) Filed: Jun. 30, 2009

(65) Prior Publication Data
US 2010/0332472 A1    Dec. 30, 2010

(51) Int. Cl.
*G06F 17/30* (2006.01)

(52) U.S. Cl.
CPC .............................. *G06F 17/30463* (2013.01)

(58) Field of Classification Search
CPC ................................................ G06F 17/30463
USPC ........................................ 707/736, 759, 769
See application file for complete search history.

(56) References Cited

U.S. PATENT DOCUMENTS

| | | | |
|---|---|---|---|
| 6,275,818 B1* | 8/2001 | Subramanian et al. | |
| 6,366,901 B1* | 4/2002 | Ellis | |
| 6,377,949 B1* | 4/2002 | Gilmour | G06F 17/30616 |
| 6,999,958 B2* | 2/2006 | Carlson et al. | |
| 7,403,942 B1* | 7/2008 | Bayliss | G06F 17/30303 707/748 |
| 7,472,113 B1* | 12/2008 | Watson | G06F 17/30448 |
| 8,255,388 B1* | 8/2012 | Luo | G06F 17/30463 707/719 |
| 2004/0010488 A1* | 1/2004 | Chaudhuri | G06F 17/30463 |
| 2004/0181521 A1* | 9/2004 | Simmen | 707/3 |
| 2004/0210563 A1* | 10/2004 | Zait | G06F 17/30312 |
| 2004/0236722 A1* | 11/2004 | Waas | G06F 17/3046 |
| 2005/0097103 A1 | 5/2005 | Zane et al. | |
| 2005/0125427 A1* | 6/2005 | Dageville et al. | 707/100 |
| 2005/0222965 A1* | 10/2005 | Chaudhuri et al. | 707/1 |
| 2005/0267877 A1 | 12/2005 | Chaudhuri et al. | |
| 2006/0020579 A1* | 1/2006 | Freedman et al. | 707/3 |
| 2006/0031216 A1* | 2/2006 | Semple | G06F 17/30858 |
| 2006/0235818 A1* | 10/2006 | Muras | G06F 17/30587 |
| 2006/0282404 A1* | 12/2006 | Chaudhuri et al. | 707/2 |
| 2008/0133458 A1* | 6/2008 | Zabback | G06F 17/30469 |
| 2008/0177722 A1 | 7/2008 | Lohman et al. | |
| 2009/0204551 A1* | 8/2009 | Wang | G06F 17/30463 705/400 |

(Continued)

OTHER PUBLICATIONS

Zhaohui Yao et al., Adaptive Cost Estimation for Client-Server based Heterogeneous Database Systems, pp. 1-19, Department of Computer Science, University of Maryland, College Park.

(Continued)

*Primary Examiner* — Shiow-Jy Fan
(74) *Attorney, Agent, or Firm* — Koestner Bertani LLP

(57) ABSTRACT

A data processing system performs query progress estimation based on processed value packets. In the illustrative data processing system, a database query processor comprises a query optimizer that creates a query plan, and a database plan executor that executes the query plan and observes intermediate result streams processed as the query plan is executed. A value packet manager anticipates value packets during query optimization, creates value packets as the intermediate result streams are processed, and compares anticipated value packets with created value packets to determine accuracy of the anticipated value packets and estimate query progress.

13 Claims, 10 Drawing Sheets

(56) References Cited

U.S. PATENT DOCUMENTS

2010/0088298 A1* 4/2010 Xu .................. G06F 17/30498
707/705

OTHER PUBLICATIONS

Navin Kabra et al., Efficient Mid-Query Re-Optimization of Sub-Optimal Query Execution Plans, pp. 106-117, Computer Sciences Department, University of Wisconsin, Madison.
Gang Luo et al., Toward a Progress Indicator for Database Queries, pp. 1-12, Univeristy of Wisconsin-Madison and NCR Advance Development Lab.

* cited by examiner

```
SELECT *
FROM HumanResources.Employee AS e
     INNER JOIN Person.Contact AS
c
     ON e.ContactID = c.ContactID
ORDER BY c.LastName
```

FIG. 6A

```
StmtText
----
  |--Sort(ORDER BY:([c].[LastName] ASC))
       |--Nested Loops(Inner Join, OUTER REFERENCES:([e].[ContactID], [Expr1004]) WITH UNORDERED PREFETCH)
            |--Clustered Index Scan(OBJECT:([AdventureWorks].[HumanResources].[Employee].[PK_Employee_EmployeeID] AS [e]))
            |--Clustered Index Seek(OBJECT:([AdventureWorks].[Person].[Contact].[PK_Contact_ContactID] AS [c]),
SEEK:([c].[ContactID]=[AdventureWorks].[HumanResources].[Employee].[ContactID] as [e].[ContactID]) ORDERED FORWARD)
```

FIG. 6B

StmtText
----

|--[NODE 1] Sort(ORDER BY:([c].[LastName] ASC))
   |--[NODE 2] Nested Loops(Inner Join, OUTER REFERENCES:([e].[ContactID], [Expr1004]) WITH UNORDERED PREFETCH)
      |--[NODE 3] Clustered Index Scan(OBJECT:([AdventureWorks].[HumanResources].[Employee].[PK_Employee_EmployeeID] AS [e]))
      |--[NODE 4] Clustered Index Seek(OBJECT:([AdventureWorks].[Person].[Contact].[PK_Contact_ContactID] AS [c]),
         [NODE 5] SEEK:([c].[ContactID]=[AdventureWorks].[HumanResources].[Employee].[ContactID] as [e].[ContactID]) ORDERED FORWARD)

FIG. 7A

| Key value | count | CPU time | Elapsed time | Arrival rate |
|---|---|---|---|---|
| A | 25 | .0024 ms | .0026 ms | 10 tuples/s |
| B | 20 | .0021 ms | .0022 ms | 10 tuples/s |
| ... | | | | |
| Z | 4 | .0009 ms | .0010 ms | 1 tuples/s |

FIG. 7B

QUERY PROGRESS ESTIMATION BASED ON PROCESSED VALUE PACKETS

BACKGROUND

A query statement can be compiled into a query plan consisting of query operators. A query operator can be executed in many different ways, for example full table scans, index scans, nested loop joins, hash joins, and others. A query optimizer is a component of a database management system that attempts to determine the most efficient way to execute a query. The query optimizer determines the most efficient way to execute a SQL statement after considering many factors related to the objects referenced and the conditions specified in the query. The determination is a useful step in the processing of any query statement and can greatly affect execution time.

The query optimizer compares the available query plans for a target input query and estimates which plan will be the most efficient in practice. One type of query optimizer operates on a cost basis and assigns an estimated cost to each possible query plan, for example selecting the plan with the smallest cost. Costs can be used to estimate the runtime cost of evaluating the query in terms of factors such as the number of I/O operations required, processor load requirements, and other factors which can be set forth in a data structure. The set of available query plans that are examined is formed by examining the possible combinations of different database operators (algorithm implementations), such as index scan and sequential scan, and join algorithms including sort-merge join, hash join, nested loops, and others. A search space can become very large according to complexity of the query.

Progress estimation during database query processing enables workload management, both human and automatic, to determine the remaining run-time of active requests and modify the overall work schedule accordingly, for example abort an execution, lower or raise a query's priority, focus on an alternative activity, and the like. In addition, accurate progress estimation permits early detection of query execution plans based on inaccurate estimates and thus chosen erroneously.

A task of a query optimizer is to determine how much progress a database query has made. In simple systems, for example an automatic teller machine that handles an automatic teller type of query such as an account information request or transaction on the account, queries are small but frequent, and optimization is simple. The problem is more difficult with a large data warehouses because a database query is much more complex, such as "for our top 100 customers, how many purchased products from three or more product lines." Such complex queries combine data from very large tables and predict the volume of data that involved at any stage of answering the query. Practically, a query may be needed to get any of the estimates. Because the queries are so complex and the amount of data processed at any stage is uncertain, determining the time for running a query, the amount of work remaining for the query, and whether the query is making progress or stuck are very difficult.

SUMMARY

Embodiments of a data processing system perform query progress estimation based on processed value packets. In the illustrative data processing system, a database query processor comprises a query optimizer that creates a query plan, and a database plan executor that executes the query plan and observes intermediate result streams processed as the query plan is executed. A value packet manager anticipates value packets during query optimization, creates value packets as the intermediate result streams are processed, and compares anticipated value packets with created value packets to determine accuracy of the anticipated value packets and estimate query progress.

BRIEF DESCRIPTION OF THE DRAWINGS

Embodiments of the invention relating to both structure and method of operation may best be understood by referring to the following description and accompanying drawings:

FIGS. 6A and 6B are data structure diagrams respectively illustrating examples of a query and a query plan; and FIGS. 7A and 7B are data structure diagrams respectively showing an example annotated query plan and an example of an anticipated value packet at a node.

DETAILED DESCRIPTION

Figure 1A:
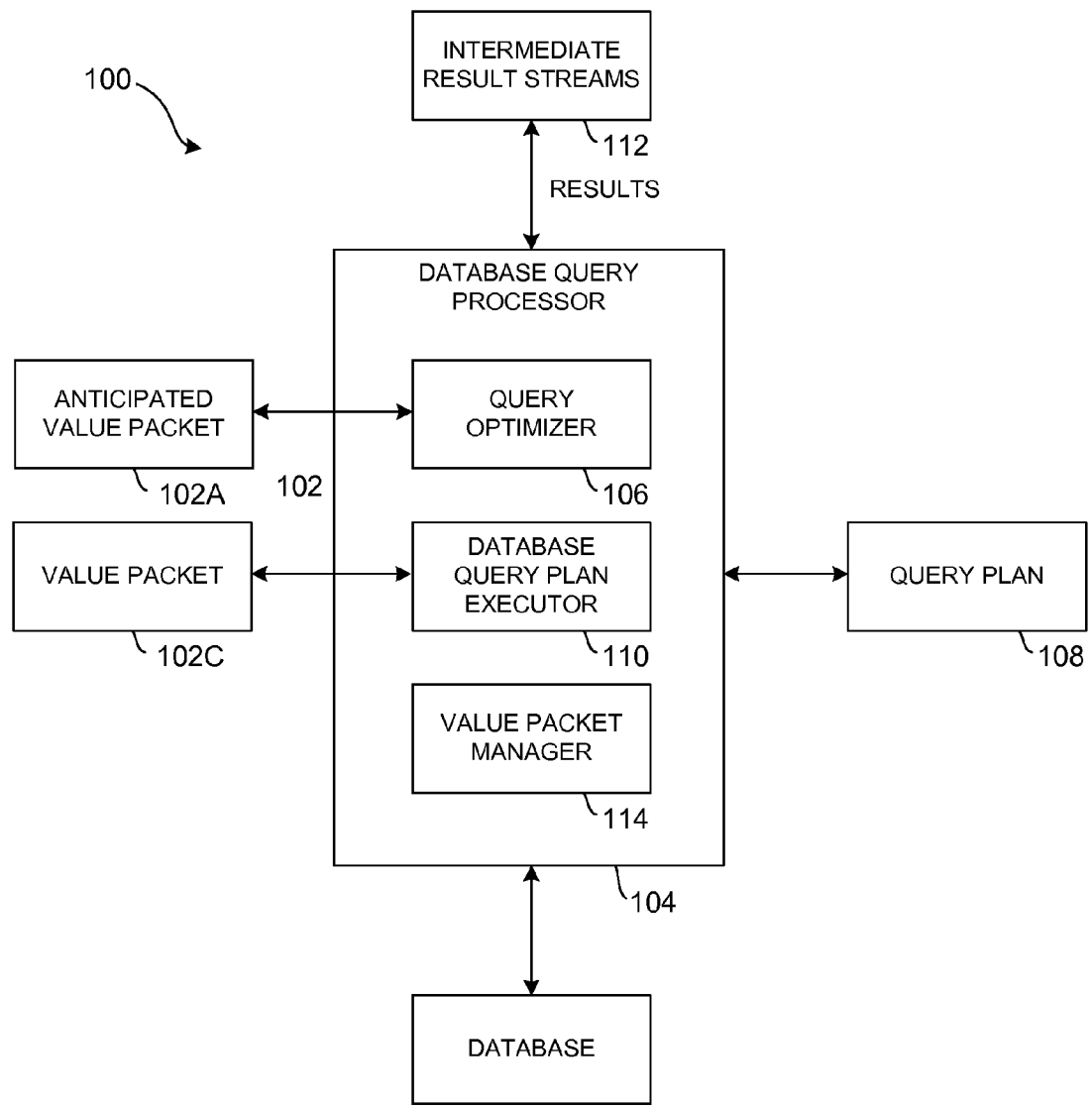
FIGS. 1A, 1B, and 1C are schematic block diagrams depicting embodiments of a data processing system that performs query progress estimation based on processed value packets.

In an illustrative system, query progress estimation can be based on processed value packets. In an example application, the progress of a running query on a data warehouse can be estimated.

In database query processing, every intermediate result stream is sorted on some criteria, whether a column present in the intermediate result, a hash value employed in a prior operation, a disk location in a prior scan, or the like. The sort order divides the stream into value packets, perhaps even hierarchical value packets based on a complex sort order on multiple keys. Query optimization can retain estimation information in a query execution plan not only about entire streams but also about anticipated value packets, in particular anticipated value packet count, size, and key value distribution over a domain. Query execution can verify whether the estimates inherent in the anticipated value packets are accurate and can produce estimates about query progress.

In the context of relational query processing, a value packet can be defined as a common attribute value that defines a group of records (or tuples) indicative of a query processing iterator's progress. Sort operations, merge-joins, B-tree scans and the like are suitable for producing an output in value packets rather than in individual records.

Value packets can be used, for example, in optimization for sort operations. A value packet can be formed by two specific records that were compared and determined to have equal keys. Each value packet can move through subsequent merge steps as a unit with only the first record within each value packet participating in merge logic. Thus, merge logic avoids performance of more comparisons than a sort with duplicate removal. If records in the same run file can possibly compare as equal, value packets can be formed while the run is written.

Analysis using value packets improves over conventional techniques such as cardinality and selectivity estimation during database query optimization, which produces merely overall size estimates for intermediate query results, even if the derivation of the overall size proceeds in steps, for example guided by a histogram. Using the conventional techniques, detail information is lost and not preserved in the data structures available during query execution. The systems and techniques disclosed herein estimate query progress based on processed value packets and preserve such detail information, enabling usage in multiple ways, notably for query progress estimation and workload management facilities based on estimates of query progress. Specifically, the detail information is the distribution of unique values in the sort keys and the number of items or records per unique value.

If the information anticipated during query optimization proves incorrect during query execution, the overall query execution effort and thus the progress so far can be reassessed. With each processed unique value in the sort keys, the remaining work can be estimated more accurately. Moreover, workload management policies can adapt invoke appropriate mechanisms such as reallocation of resources such as memory, processors (or threads), and disk bandwidth. Drastic actions may include pausing a query execution for later resumption or, even more drastically, aborting the query execution plan to re-invoke query optimization with better information for finding a better query execution plan.

After processing a unique value in an intermediate query result's sort order and all the individual items or records associated with the unique value, the number of unique values in the entire stream can be adjusted (for example, based on the fraction of the domain processed) as well as the number of records or items associated with each unique value. The number of unique values affects whether or not bit vector filtering should be employed and how large the bit vector filters should be, how much memory is used for aggregation and duplicate elimination operations, and the like. The number of records or items per unique value affects whether distribution skew and duplicate skew and likely to be problems in highly parallel query execution or in hash-based query execution operations, whether early aggregation or duplicate elimination is worthwhile is sort-based operations, and the like.

Referring to FIG. 1A, a schematic block diagram depicts an embodiment of a data processing system 100 that performs query progress estimation based on processed value packets 102. In the illustrative data processing system 100, a database query processor 104 comprises a query optimizer 106 that creates a query plan 108, and a database query plan executor 110 that executes the query plan 108 and observes intermediate result streams 112 processed as the query plan 108 is executed. A value packet manager 114 anticipates value packets 102A during query optimization, creates value packets 102C as the intermediate result streams 112 are processed, and compares anticipated value packets 102A with created value packets 102C to determine accuracy of the anticipated value packets 102A and estimate query progress.

In an illustrative embodiment, the value packets 102 can be formed of data statistics. The value packet manager 114 collects and analyzes detailed information about the data statistics and dynamically corrects the data statistics during query processing. The statistics thus can be used to produce an estimate of the percentage of work completed.

In contrast to conventional query optimization that treats each intermediate result as a complete stream, without regard to value packets within the stream. The illustrative data processing system 100 exploits the concept "value packet" in relational query processing to improve performance and efficiency.

In an example implementation, value packets can be fine-grained versions of the statistics collected at the output of the segments of the query plan 108, such as output cardinality, average tuple size, and the like, and can also include collection of statistics about distinct values and about intermediate key value distributions.

In various embodiments, different estimation methods can be used at different points in query execution, based on the types of operators. For example, the estimate can be based on distribution of values and knowledge of the current key value if input is sorted and with known reliable key value distribution, and tuple count/estimated cardinality can be used otherwise.

Thus, the disclosed systems and methods enable adjustment of cardinality measurements when observing operator-level runtime statistics.

The database query plan executor 110 can sort the intermediate result streams 112 according to predetermine criteria and divides the intermediate result streams 112 into value packets 102 according to sort order.

The value packet manager 114 preserves detail information in data structures available during query execution. The detail information can include, for example, a distribution of unique values in sort keys and number of items or records per unique value.

After detection of a unique value in an intermediate query result's sort order and after processing of individual items and records associated with the unique value, the value packet manager 114 adjusts the number of unique values in the intermediate result stream 112, and the number of records and items associated with the unique value.

In some embodiments, the value packet manager 114 can determine a confidence level indicator at an operator level which is indicative of the progress estimate confidence level. The confidence level indicator similar is similar to an "inaccuracy potential" and "bounding boxes" of conventional systems with the difference that the inaccuracy potential and the bounding boxes are at a query level, as opposed to the operator level of the illustrative system. Such a confidence level indicator can be used to produce a confidence level for the progress estimate.

In other example embodiments, the value packet manager 114 can use multiple estimation methods at a corresponding query execution points based on type of operator.

In addition to operator-level runtime statistics, the value packet manager 114 can also monitor statistics for the overall system, and consider such overall system statistics when estimating progress. For example, the ratio of "value packets"/input tuples/elapsed time is known for each operator, and intermediate key value distributions are known, from which some of the query's memory requirements (for example, for aggregation, as you noted) can be allocated. Knowing memory requirements enables analysis of system memory usage and identification of whether or not the query is being "starved". Thus in a further example, the value packet manager 114 can be implemented that analyzes operator-level runtime statistics and overall system statistics in combination for estimating query progress.

Figure 1B:
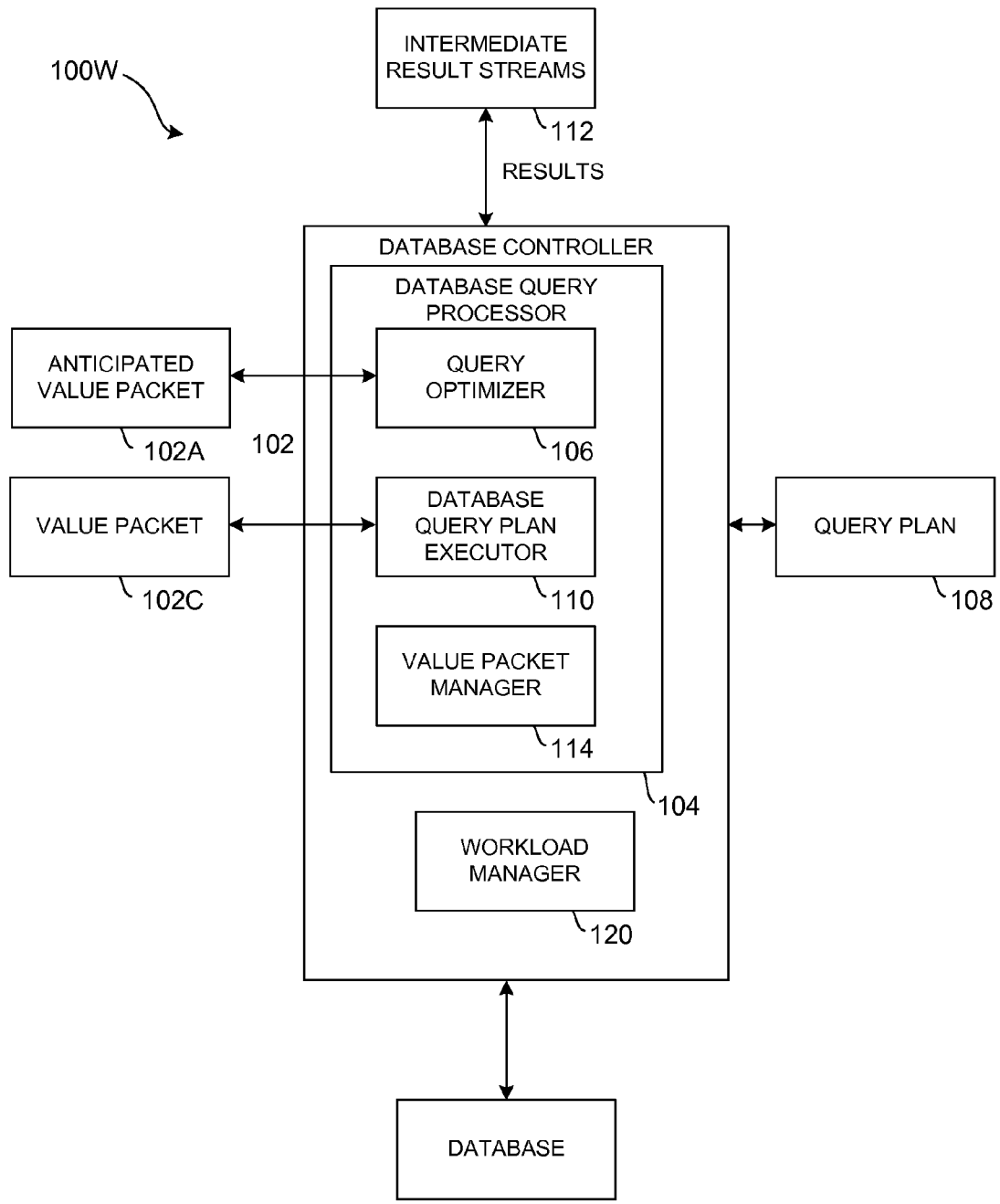

Referring to FIG. 1B, a schematic block diagram depicts an embodiment of a data processing system 100W that performs query progress estimation based on processed value packets 102 in a workload management system. A workload manager 120 uses the estimate of query progress to determine remaining run-time of active requests and modify overall work schedule according to the estimate.

In an illustrative implementation, the value packet manager 114 can determine whether the anticipated value packets 102A are proven to be incorrect during query execution and, if so, reassesses query progress using various techniques such as by estimating remaining work with increased accuracy with processed unique values in sort keys, adapting workload management policies and reallocating resources, selectively pausing query execution for later resumption, selectively aborting the query plan for re-invoking query optimization with improved information and an improved query plan, or the like.

Figure 1C:
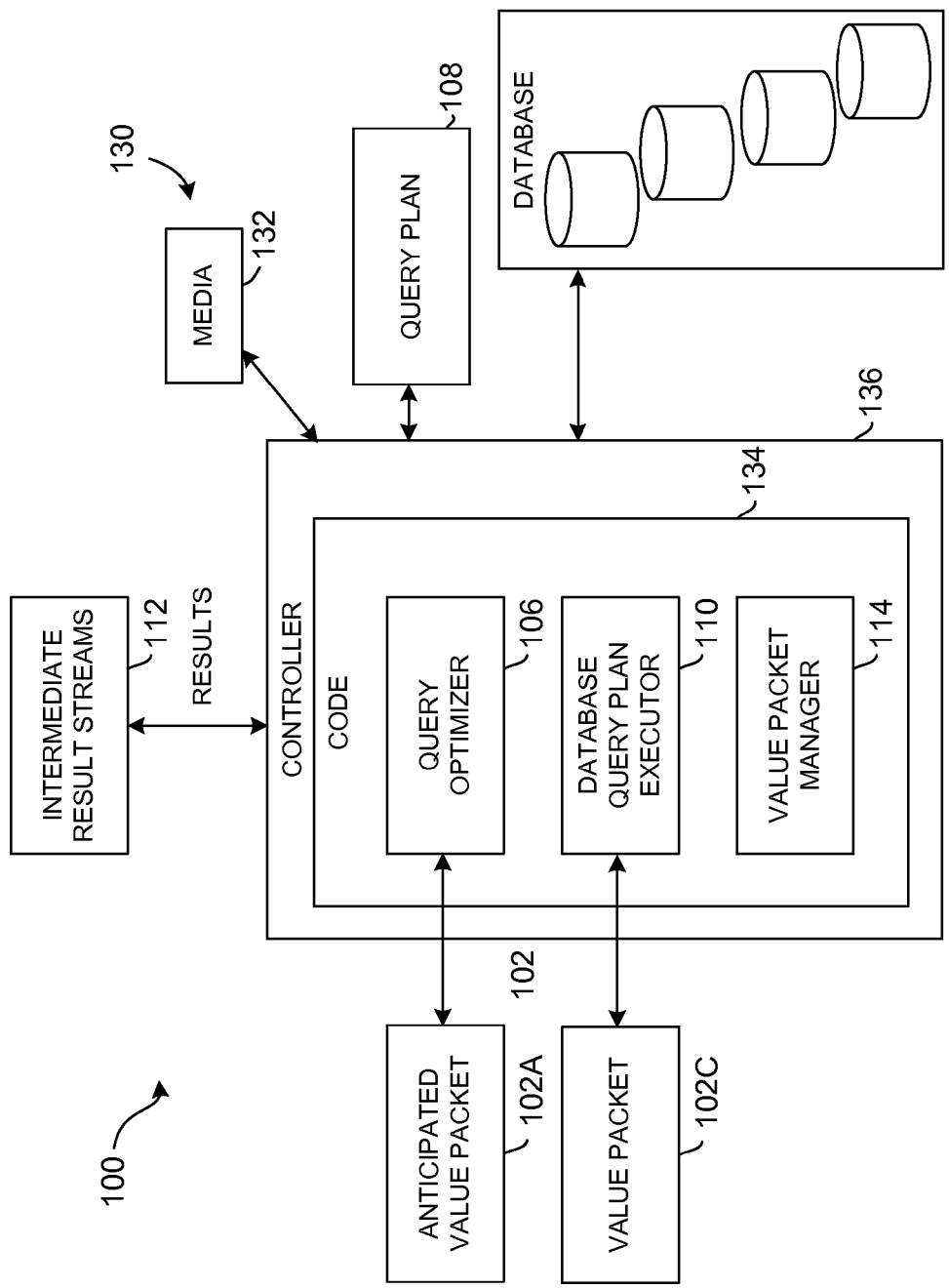

Referring to FIG. 1C, a schematic block diagram depicts an embodiment of an article of manufacture 130 that can be used with a data processing system 100 enabling performance of query progress estimation based on processed value packets 102. The illustrative article of manufacture 130 comprises a controller-usable medium 132 having a computer readable program code 134 embodied in a controller 136 for processing data. The computer readable program code 134 can further comprise code causing the controller 136 to create a query plan 108, code causing the controller 136 to execute the query plan 108 and observe intermediate result streams 112 processed as the query plan 108 is executed, and code causing the controller 136 to anticipate value packets 102A during query optimization. Code is also included that causes the controller 136 to create value packets 102C as the intermediate result streams 112 are processed. Further code causes the controller 136 to compare anticipated value packets 102A with created value packets 102C to determine accuracy of the anticipated value packets 102A and estimate query progress.

The data processing system 100 can perform query progress estimation based on processed value packets 102 comprising a controller or processor 136 that executes the query optimizer 106, the database query plan executor 110, and the value packet manager 114.

The illustrative data processing system 100 and operating technique enable earlier detection of inaccurate information about key distributions in intermediate results of database query processing. Earlier detection permits earlier corrective action such as re-optimization, resource re-allocation, algorithm adaptation for maximal robustness, automatic or manual termination of the current execution, and the like. Earlier corrective action permits less wasted effort and more efficient processing of the remaining data in the intermediate result.

In contrast, collection of actual statistics after query execution as in traditional systems, for example by instrumentation monitoring passed information, cannot achieve such earlier detection and corrective action.

A conventional query processor can instrument one of the operators to enable measurement of statistics such as the number of nodes, but most of these estimates are very rough. For example, cardinality (the number of rows or tuples that have passed), the number of data items that have been processed, and the size of the data items may be tracked. Distinct values, such as how many of these answers were about the state of California are not tracked.

One of the difficulties in attempting to estimate the size of intermediate results is skew, which can be defined as the difference in the data distribution from what is expected. For example, for a query wherein the predicate applies to all residents of California, the results are different from results of a query applied to all residents of a small town in Iowa.

Skew can also be defined as the presence of multiple tuples in or with identical values for an operator attribute. The tuples can be called a value packet for each such value and are contiguous in input relations after sorting. Thus an equivalent definition of skew is the presence of a value packet containing more than one tuple. The query progress estimation based on processed value packets that is disclosed herein enables operation on intermediate values and backtracking to earlier detect inaccurate information about key distributions.

The illustrative data processing system 100 can account for the value distributions and thus enable detection of skew. Query progress estimation based on processed value packets can also efficiently handle conditions in which columns are not correlated, for example asking for purchases of a product in one location may be substantially different from purchases of the same product in another location. While such lack of correlation may be common knowledge to a human being, computer knowledge is limited unless modeled specifically in database statistics.

Query progress estimation based on processed value packets can efficiently handle the general problem of estimating progress and the specific limitations inherent in maintaining statistics in database tables for estimating sample size and number of statistics. For example, a histogram may be maintained showing the distribution of values on a table. In the specific example of the people in an employee database, some number may be Californians, another number may be from Rhode Island, and still another number are from Wyoming. A query may inquire of people in California and is optimized to look up statistics, determine how many of those people are from California, and make estimates based on the determination. A problem is that the histograms and corresponding statistics are inaccurate due to a form of compression in which information is lost. The histograms are not as precise as actual data, can become out-of-date, and may include data that is not even correlated with the field.

The data processing system 100 and associated technique for query progress estimation based on processed value packets enables collection and analysis from detailed information about the statistics, thus dynamically correcting the statistics during processing. The statistics are anticipated during compilation. The anticipated statistics are compared to actual statistics attained during query execution and, based on the comparison, a determination is made of whether the estimation (anticipation) is suitably accurate based on what is observed during actual execution. The statistical model of the data for usage in estimation can thus be modified based on the results.

The technique operates as a filter which determines which statistics to keep, how the statistics are prepared, and how the actual data is adjusted. Thus, the statistics are adapted while processing. For example, during processing, a result can pass and the value packet manager 114 (as an observer) can operate under the premise (based on estimations) that 1000 pieces of information are expected to pass. When 1300 pieces of information have passed, that the compiled information is incorrect is suspected. By the time 15,000 pieces of information have passed, that the information is widely incorrect is known. Similarly, if only 100 items have passed when the stream ends, for example by an end-of-stream indicator, and 1000 items were anticipated, then the model is known to be incorrect. The value packet manager 114 can thus detect conditions of both too much and too little data. Query progress estimation based on processed value packets enables early determination of an incorrect condition. For example, if passage of 1000 items is anticipated, the illustrative technique can determine whether the anticipation is correct after only a small number of items (for example 50) have passed.

The illustrative technique for query progress estimation based on processed value packets uses observation of statistics while running a query to use the observed statistics to determine progress of the running queries. The technique uses knowledge at runtime in query processing to estimate progress of the query.

Thus, for example, if 1000 items are anticipated, the disclosed query progress estimation enables corrective action whether the end-of-stream indication is received after passage of 100 items or 4000 items. In either case, the comparison information is known to be incorrect. The model is thus much more refined so that, after passage of 50 items, a determination may be made that the 50 items are approximately correct, or possibly problematic at 30 or 90 items. Thus instead of considering an intermediate result of 1000 pieces of information, the model of 1000 information pieces can be considered as multiple segments of the stream and all segments in combination add up to 1000 pieces. Thus when actual segments of the stream are monitored and, if the first segment is anticipated to be 20 items but observed to be only 5, then the compile-time information of the early segment is wrong. Probably other segments are also wrong. Furthermore, if the first three segments are anticipated to be 90 pieces of information and in each case only about 45 items pass, then a pattern of overestimation by a factor of two may be determined. By dividing the stream into segments, finer and earlier information are available. By receiving finer and earlier information, more accurate and timely adjustments may be made. Possible adjustments may include (1) modifying or augmenting the specific data in the database catalog, (2) displaying a progress file on a user's screen and changing how much of the progress file is black and how much is white, (3) changing how much memory is allocated to subsequent operators that consume and process this data, (4) stopping or resuming acceptance of additional requests into the database system into the system at large, and a myriad of other adjustments. The many adjustments can be made based on the illustrative run-time verification and compile-time estimation.

The improvements in efficiency and performance are attained by dividing the intermediate streams into segments, making available information much more accurately and timely.

Figure 2:
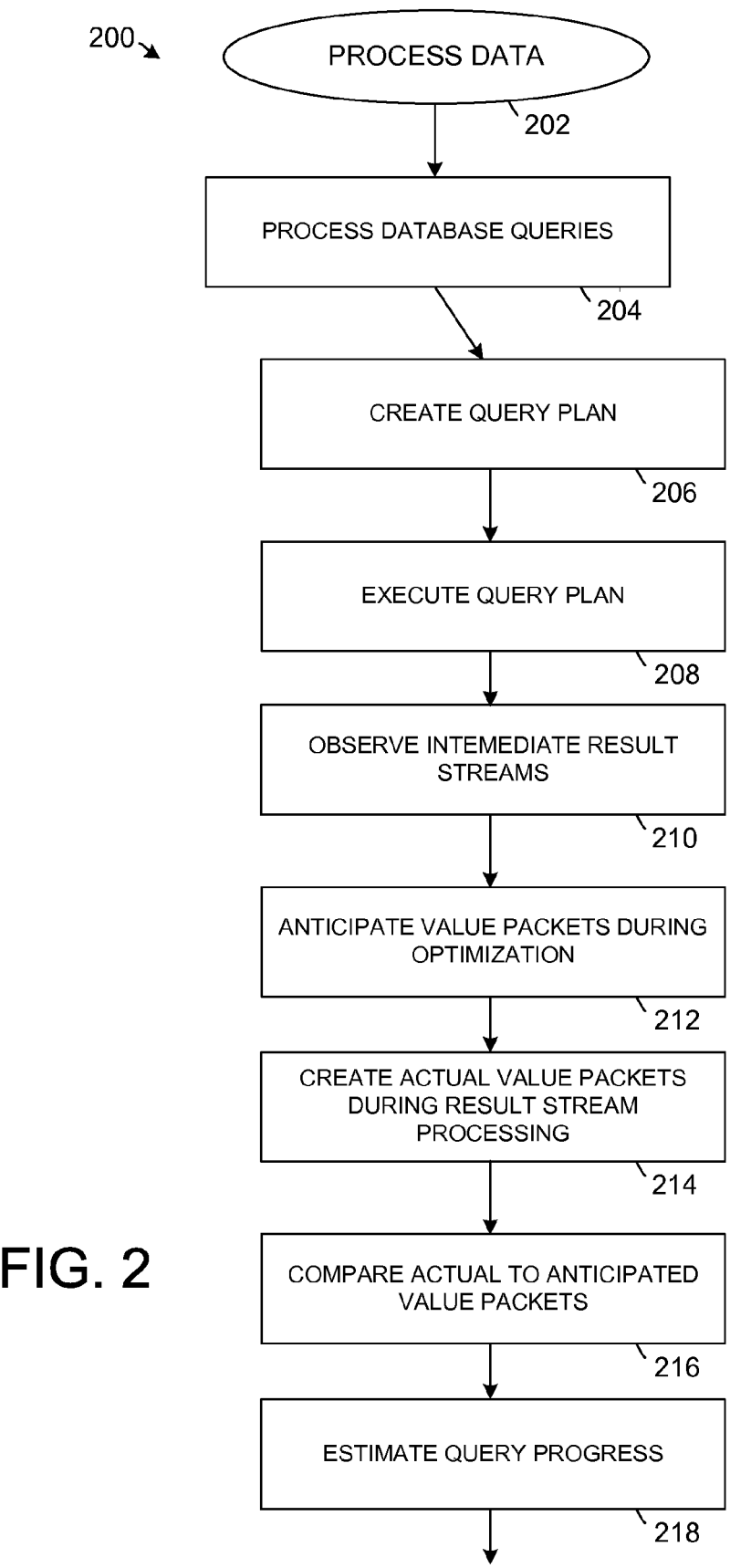
FIG. 2 is a schematic flow chart illustrating an embodiment of method for performing query progress estimation based on processed value packets.

Referring to FIG. 2, a schematic flow chart illustrates an embodiment of method 200 for performing query progress estimation based on processed value packets. A method for processing 202 data comprises processing 204 database queries, which further comprises actions of creating 206 a query plan, executing 208 the query plan, and observing 210 intermediate result streams processed as the query plan is executed. Anticipated value packets are anticipated 212 during query optimization. Actual value packets are created 214 as the intermediate result streams are processed. Anticipated value packets are compared 216 with created value packets to determine accuracy of the anticipated value packets and query progress is estimated 218 based on the comparison.

Figure 3:
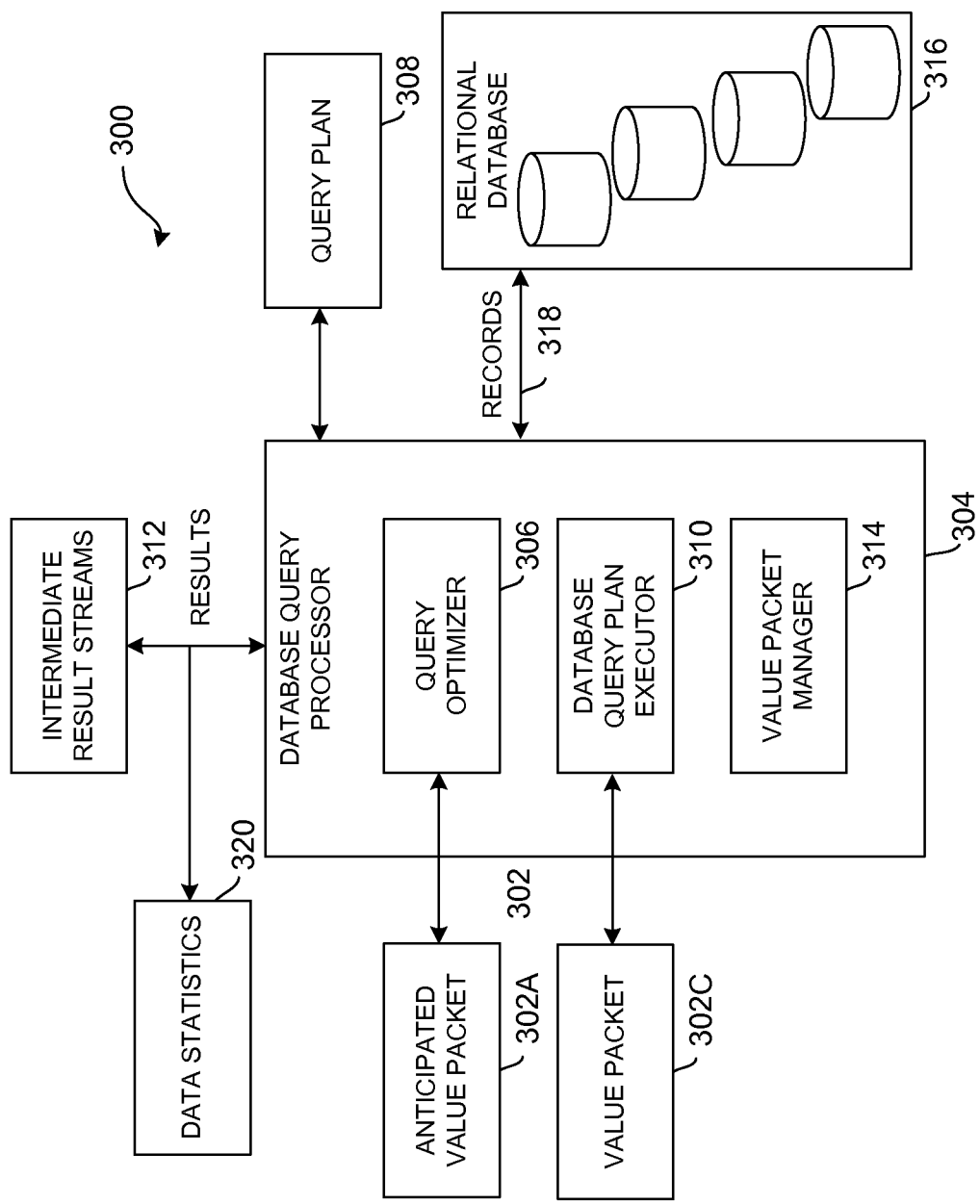
FIG. 3 is a schematic block diagram showing another embodiment of a data processing system that performs query progress estimation based on processed value packets.

Referring to FIG. 3, a schematic block diagram depicts another embodiment of a data processing system 300 that performs query progress estimation based on processed value packets 302. The data processing system 300 comprises a database query processor 304 in a relational database 316 having a query optimizer 306 that creates a query plan 308, verifies compliance of a subset of records 318 from the relational database 316 with a query criteria as the query plan 308 is executed, and generates intermediate result streams 312 based on the compliance verification. The database query processor 304 comprises a database plan executor 310 and a value packet manager 314. The database plan executor 310 executes the query plan 308, observes the intermediate result streams 312, sorts the intermediate result streams 312 according to predetermine criteria, and divides the intermediate result streams 312 into value packets 302 according to sort order. The value packet manager 314 collects and analyzes detailed information about data statistics 320, dynamically corrects the data statistics 320 during query processing, and creates value packets 302 based on the data statistics 320 as the intermediate result streams 312 are processed.

The value packet manager 314 anticipates value packets 302A during query optimization, creates value packets 302C as the intermediate result streams 312 are processed, and compares anticipated value packets 302A with created value packets 302C to determine accuracy of the anticipated value packets 302A and estimate query progress.

Figure 4A:
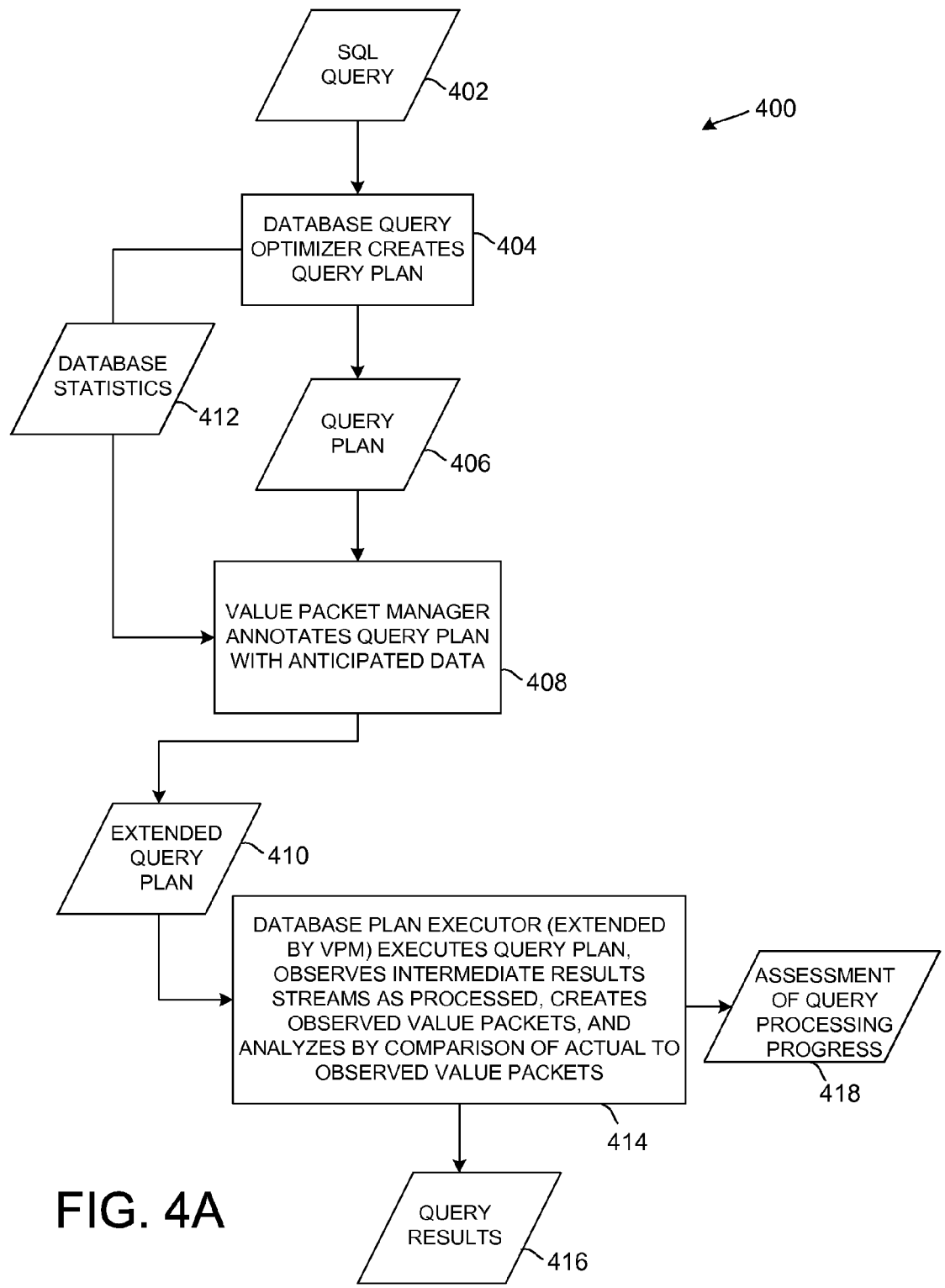
FIGS. 4A and 4B are schematic flow charts illustrating an embodiment of a method for query estimation based on processed value packets.
Figure 4B:
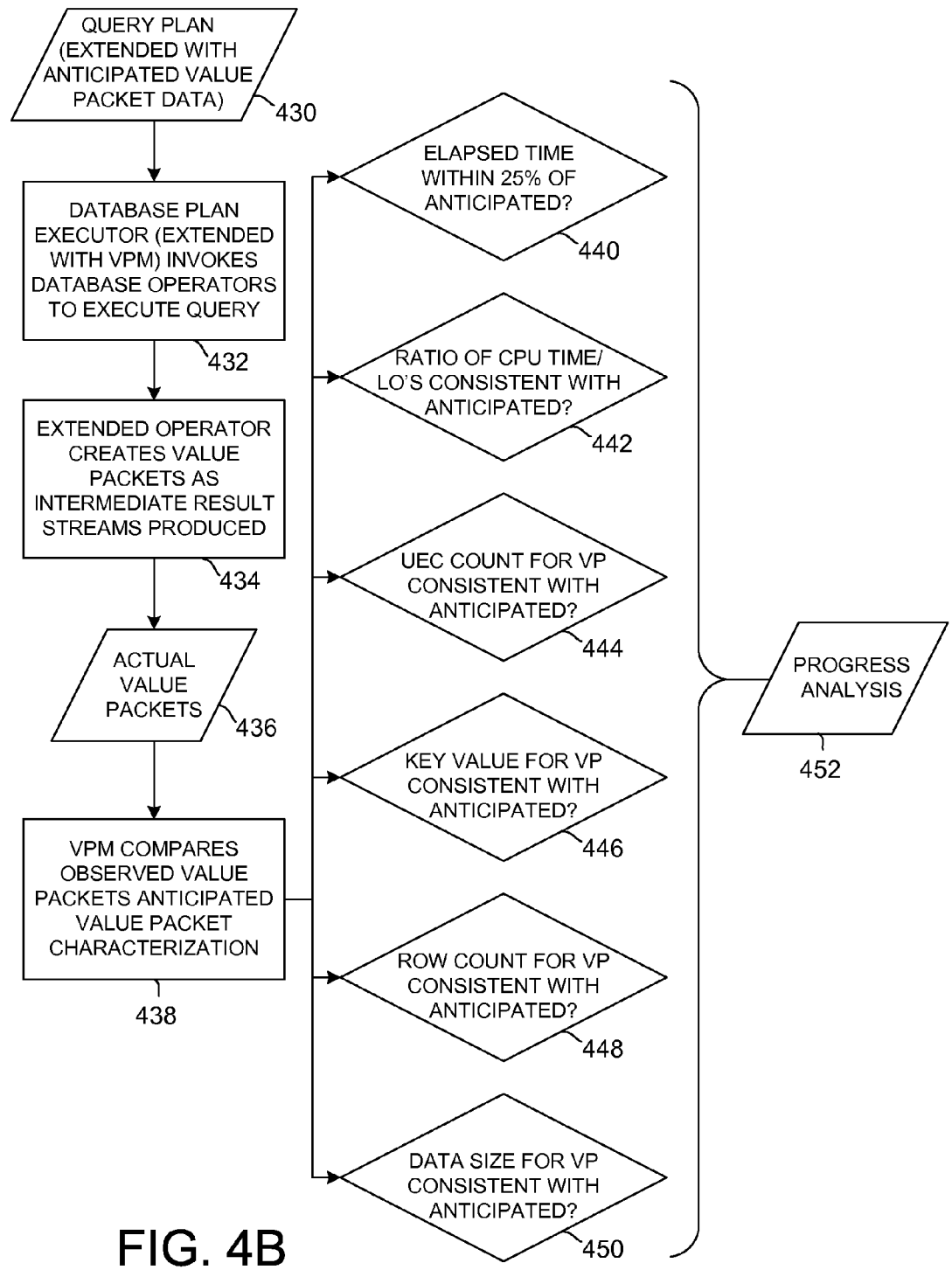
Figure 5A:
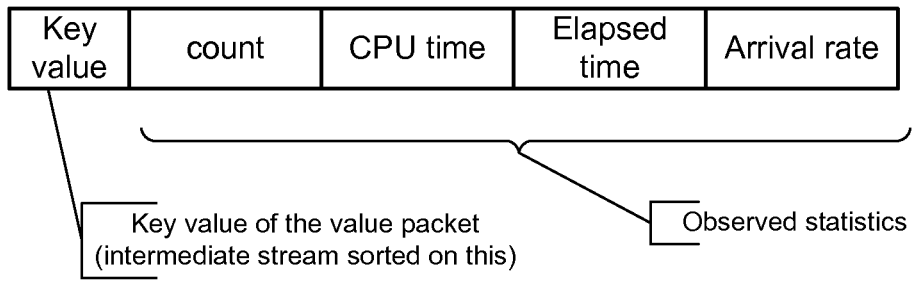
FIGS. 5A and 5B are data structure diagrams respectively showing an example embodiment of an observed value packet and an anticipated value packet.

Referring to FIGS. 4A and 4B, schematic flow charts illustrate an embodiment of a method for query estimation based on processed value packets. FIG. 4A depicts a technique 400 for using value packets for progress indicators. A SQL query 402 arrives at the database query optimizer 404. The database query optimizer 404 creates a query plan 406 which is basically a tree of operators, cost estimates, and cardinality estimates. FIG. 5A is a data structure diagram showing an example embodiment of an observed value packet.

FIGS. 6A and 6B are data structure diagrams respectively illustrating examples of a query (for example a SQL query as shown) and a query plan. The specific example query plan is a SQL initial plan from http://en.wikipedia.org/wiki/Query_plan. The example typical query plan indicates that a query engine will perform a scan over the primary key index on an Employee table and a matching seek through a primary key index (ContactID column) on a Contact table, to find matching rows. Resulting rows from each side can be shown to a nested loops join operator, sorted, then returned as a result set to the connection. To tune the query, the user understands different operators possibly used by the database and which operators may be more efficient than others while still forming semantically correct query results.

Figure 5B:
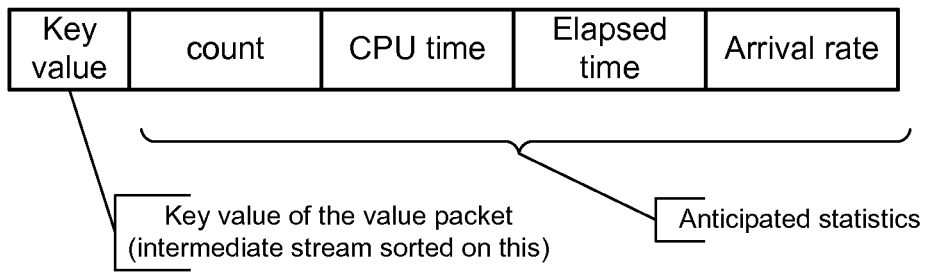

Referring again to FIGS. 4A and 4B, a value packet manager 408 annotates the query plan with information about what is anticipated form the value packets will take, forming an annotated or extended query plan 410. FIG. 5B is a data structure diagram showing an example anticipated value packet. FIGS. 7A and 7B are data structure diagrams respectively showing an example annotated query plan and an example of an anticipated value packet at a node. The optimizer is a table of statistics about the database table to enable initial formation the database statistics 412. The database statistics 412 are also available to the value packet manager. Some of the information in the database statistics

412 might be, for example, how many tuples in a value packet, how many tuples should go into a value packet, what the expected estimation of data in the value packet is to be, for example are all of the tuples expected to be from California, is a large range of ages of customers expected such as from 6 months to 80 years. Other information in the database statistics 412 can include what is the expected value packet, what is the recommended structure for the value packets, what is the anticipated value for the data, what data distribution is expected. Many other examples of database statistics are possible. The database statistics information is added to the query plan 406 to form the annotated or extended query plan 410.

The value packet manager (VPM) extends the database plan executor 414. The database plan executor 414 is extended to execute the query plan while observing the intermediate data streams being processed.

The database plan executor in traditional operation takes a normal query plan and creates a series of query operators and executes the plan using the operators. The query plan is a tree in which each node of the tree specifies which operator will do the work. Normally the normal database plan executor takes the query and ships the work off according to specification of the query operators.

The disclosed database plan executor 414 is extended with the value packet manager to execute the plan while the operators are extended to handle value packets. The database plan executor 414 executes the query plan and produces query results 416, in common with operations of a traditional database plan executor. In the extended database plan executor 414, an assessment of query processing progress 418 is also produced, which informs of query processing progress.

In various embodiments, query results 416 and/or assessment of query processing progress 418 can optionally be fed back into the database statistics 412. Thus information processed by the value packet manager (VPM) can percolate back to the database statistics system, but such feedback is not essential.

FIG. 4B illustrates a technique for using value packets to evaluate query progress and describes operations of the extended database plan executor. The database plan executor 432 receives the extended query plan 430 that includes the anticipated information. The anticipated information describes about how to make the packet and other information kept with the packet.

Extended operators 434 create value packets while producing intermediate result streams. Any database operator can be extended. The extended operator, while producing query results to pass to the next operator, also uses the directions from the anticipated value packet information to make actual value packets 436 that represent or characterize the data that has passed through the system so far.

Anticipated value packets can be descriptively called meta-value packets, pre-value packets, or other word that expresses the transformational or transcending aspects of operation. The value packet manager 438 receives the stream of actual value packets and compares the actual value packets to the anticipated value packets (meta-value packets), which are indicative of what is anticipated for the specific operator, query, and plan. The several decision blocks denote examples of the type of questions that the value packet manager uses to make a comparison. The four depicted examples are for illustrative purposes only. Any suitable question type can be invoked. In a first example 440, the elapsed time is analyzed for consistency with an anticipated value, for example within a certain percentage such as 25%. In a second example 442, the ratio of CPU time to latency is determined for consistency with anticipated conditions. In a third example 444, the data piece count for the value packet can be analyzed for consistency with anticipated counts. In a fourth example 446, the key value distribution for the observed value packet can be analyzed for consistency with an anticipated distribution. In a fifth example 448, the row count for the value packet can be viewed for consistency with what is anticipated. In a sixth example 450, the data size for the value packet can be reviewed for consistency with anticipated values. The analysis is used to produce a progress analysis 452.

The illustrative examples, analyses are performed according to comparison with anticipated questions. Other examples can analyze on the basis of a relative threshold, for example is the row count within 15% of anticipated. Other examples can involve the time passage, such as is the throughput slower than expected. In other implementations, the analysis can be categorized, for example one category may be time questions such as, is the time elapsed so far lower, is more CPU time used than expected.

In other implementations, adjusted expectations of an analysis of the state can be made, for example is the query bogging down the system, is the query being starved, and the like.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A system comprising:
a processor;
a query processor coupled to the processor to create a query plan;
a query plan executor coupled to the processor to:
execute the query plan; and
observe intermediate result streams processed as the query plan is executed;
a value packet manager coupled to the processor to:
anticipate value packets during query optimization, wherein:
a value packet is a common attribute value defining a group of records indicative of a query processing iterator's progress; and
the value packet includes two records determined to have a same key, wherein the key corresponds to a particular sort order;
create value packets as the intermediate result streams are processed;
compare anticipated value packets with created value packets to determine accuracy of the anticipated value packets;
estimate, using a first method of estimation, a progress of the query at a first point in the query, the value packet manager to:
determine an estimated value for anticipated value packets of:
an elapsed time;
a ratio of CPU time to latency;
a data piece count;
a key value distribution;
a row count; and
a data size; and
compare the estimated values of the anticipated value packets to corresponding actual values for created value packets;
based on the comparison of the estimated values of the anticipated value packets to the corresponding actual values for the created value packets, determine a confidence level indicator of the query progress estimate, wherein the confidence level indicator indicates a level of confidence in the estimate of progress of the query plan at an operator level at the first point in the query; and
a workflow manager coupled to the processor to:
receive the query progress estimate;
receive the confidence level indicator of the query progress estimate; and
modify a workflow of the query plan based on the query progress estimate and the confidence level indicator of the query progress estimate.

2. The system of claim 1, further comprising the value packet manager to:
collect information about the data statistics;
analyze the collected information about the data statistics; and
dynamically correct the data statistics during query processing based on the analyzed information about the data statistics.

3. The system of claim 1, further comprising the query plan executor to:
sort the intermediate result streams according to predetermined criteria; and
divide the intermediate result stream into value packets according to the sort order.

4. The system of claim 1, further comprising the workload manager to:
determine a remaining run-time of active requests based on the estimate of query progress; and
modify an overall work schedule based on the estimate.

5. The system of claim 1, further comprising the value packet manager preserve information in data structures available during query execution, wherein the information includes:
distribution of unique values in sort keys;
a number of items per unique value; and
a number of records per unique value.

6. The system of claim 1, further comprising the value packet manager to:
determine that the anticipated value packets are incorrect during query execution; and
reassess query progress to:
estimate remaining work using processed unique values in sort keys;
adapt workload management policies through reallocation of resources;
selectively pause query execution for later resumption; and
selectively abort the query plan for re-invoking query optimization with improved information and an improved query plan.

7. The system of claim 1, further comprising the value packet manager to:
adjust a number of unique values in the intermediate result stream, wherein the adjustment is based on:
the processing of a unique value in an intermediate query result's sort order; and
an individual record associated with the unique value; and
adjust a number of records and items associated with the unique value.

8. The system of claim 1, further comprising the value packet manager to estimate the progress of the query at a second point in the query using a second method of estimation, wherein the second method of estimation is different than the first method of estimation.

9. The system of claim 1, further comprising the value packet manager to:
analyze operator-level runtime statistics;
analyze overall system statistics; and
estimate query progress using a combination of operator-level runtime statistics and overall system statistics.

10. The system of claim 1, further comprising the value packet manger to:
select the first method of estimation based on a first type of operator; and
select the second method of estimation based on a second type of operator.

11. The system of claim 10, wherein:
the first type of operator includes a distribution of values of a sorted input; and
the second type of operator includes a tuple count and estimated cardinality.

12. A method comprising:
creating a query plan;
executing the query plan;
observing intermediate result streams processed as the query plan is executed;
anticipating value packets during query optimization, wherein:

a value packet is a common attribute value defining a group of records indicative of a query processing iterator's progress; and the value packet includes two records determined to have a same key, wherein the key corresponds to a particular sort order;

creating value packets as the intermediate result streams are processed; and comparing, by a hardware processor, anticipated value packets with created value packets to determine accuracy of the anticipated value packets and estimate query progress;

estimating, using a first method of estimation, a progress of the query at a first point in the query, wherein estimating a progress of the query includes:

determining an estimated value for anticipated value packets of:
an elapsed time;
a ratio of CPU time to latency;
a data piece count;
a key value distribution;
a row count; and
a data size; and comparing the estimated values of the anticipated value packets to corresponding actual values for created value packets;

based on the comparison of the estimated values of the anticipated value packets to the corresponding actual values for the created value packets, determining a confidence level indicator of the query progress estimate, wherein the confidence level indicator indicates a level of confidence in the estimate of progress of the query plan at the first point in the query; and modifying a workflow of the query plan based on the estimated progress of the query and the determined confidence level indicator of the query progress estimate, wherein modifying a workflow of the query plan includes reallocating memory resources and processing resources.

13. A system comprising:

a processor; and a non-transitory computer readable medium containing instructions executable by the processor to:

create a query plan, wherein the instructions to create a query plan include instructions to:
verify compliance of a subset of records from a relational database with a query criteria as the query plan is executed; and
generate intermediate result streams based on the compliance verification;

execute the query plan, wherein the instructions to execute the query plan include instructions to:
observe the intermediate result streams;
sort the intermediate result streams according to predetermined criteria; and
divide the intermediate result stream into value packets according to a sort order, wherein:
a value packet is a common attribute value defining a group of records indicative of a query processing iterator's progress; and
the value packet includes two records determined to have a same key, wherein the key corresponds to a particular sort order;

collect information about data statistics, wherein the instructions to collect information about data statistics include instructions to:
analyze the collected information;
dynamically correct the data statistics during query processing; and
create value packets based on the data statistics as the intermediate result streams are processed;

anticipate value packets during query optimization;

create value packets as the intermediate result streams are processed;

compare anticipated value packets with created value packets to determine accuracy of the anticipated value packets and estimate query progress, estimate, using a first method of estimation, a progress of the query at a first point in the query, wherein the instructions to estimate a progress of the query at the first point in the query include instructions to:
determine an estimated value for anticipated value packets of:
elapsed time;
a ratio of CPU time to latency;
a data piece count;
a key value distribution;
a row count; and
a data size; and
compare the estimated values of the anticipated value packets to corresponding actual values for created value packets determine a confidence level indicator of the query progress based on the comparison of the estimated values of the anticipated value packets to the corresponding actual values for the created value packets, wherein the confidence level indicator indicates a level of confidence in an estimate of progress of the query processing at the first point in the query; and modify a workflow of the query plan based on the estimate of the progress of the query and the confidence level indicator of the query progress estimate, wherein the instructions to modify a workflow of the query plan include instructions to abort the query plan.

* * * * *